US009386311B2

(12) United States Patent
Lee et al.

(10) Patent No.: US 9,386,311 B2
(45) Date of Patent: Jul. 5, 2016

(54) MOTION ESTIMATION METHODS FOR RESIDUAL PREDICTION (75) Inventors: Sang-Hee Lee, Santa Clara, CA (US); Fangwen Fu, Folsom, CA (US); Zhijun Lei, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 224 days.

(21) Appl. No.: 13/977,491

(22) PCT Filed: Dec. 1, 2011

(86) PCT No.: PCT/US2011/062778
§ 371 (c)(1),
(2), (4) Date: Jun. 28, 2013

(87) PCT Pub. No.: WO2013/081615
PCT Pub. Date: Jun. 6, 2013

(65) Prior Publication Data
US 2013/0279581 A1    Oct. 24, 2013

(51) Int. Cl.
*H04N 7/36*    (2006.01)
*H04N 19/51*    (2014.01)
(Continued)

(52) U.S. Cl.
CPC ....... *H04N 19/00587* (2013.01); *H04N 19/132* (2014.11); *H04N 19/184* (2014.11);
(Continued)

(58) Field of Classification Search
CPC .......... H04N 19/00587; H04N 19/132; H04N 19/184; H04N 19/30; H04N 19/42; H04N 19/43; H04N 19/463; H04N 19/51
USPC ...................................... 375/240.12
See application file for complete search history.

(56) References Cited

U.S. PATENT DOCUMENTS 8,606,028 B2 * 12/2013 Noda et al. .................... 382/238
8,798,149 B2 *  8/2014 Wu et al. .................. 375/240.15
(Continued)

FOREIGN PATENT DOCUMENTS

TW            1332799        11/2010
TW            1333358        11/2010
WO      2013/081615 A1      6/2013

OTHER PUBLICATIONS

International Preliminary Report on Patentability and Written Opinion received for PCT Patent Application No. PCT/US2011/062778, mailed on Jun. 12, 2014, 7 pages.
(Continued)

*Primary Examiner* — Jay Patel
*Assistant Examiner* — Francis G Geroleo
(74) *Attorney, Agent, or Firm* — Lynch Law Patent Group, P.C.

(57) ABSTRACT

Systems, apparatus and methods are described including determining a first value by reducing a bit-length of a reference pixel value and adding a first predetermined value to the result and determining a second value by subtracting a residual pixel value from a current pixel value to generate a difference value, reducing a bit-length of the difference value and adding the first predetermined value to the result. The range of the second value may then be clipped by setting the second value to zero when the second value is equal to or less than a second predetermined value and setting the second value to a third predetermined value when the second value is equal to or greater than a fourth predetermined value. The first value and the second value may then be used for inter-layer residual prediction in Scalable Video Coding (SVC) systems.

22 Claims, 5 Drawing Sheets

(51) Int. Cl.
| | |
|---|---|
| H04N 19/30 | (2014.01) |
| H04N 19/463 | (2014.01) |
| H04N 19/132 | (2014.01) |
| H04N 19/184 | (2014.01) |
| H04N 19/42 | (2014.01) |
| H04N 19/43 | (2014.01) |

(52) U.S. Cl.
CPC .............. *H04N 19/30* (2014.11); *H04N 19/42* (2014.11); *H04N 19/43* (2014.11); *H04N 19/463* (2014.11); *H04N 19/51* (2014.11)

(56) References Cited

U.S. PATENT DOCUMENTS

| | | | |
|---|---|---|---|
| 8,873,621 B2* | 10/2014 | Kim et al. ................ | 375/240.03 |
| 8,995,525 B2* | 3/2015 | Wiegand et al. ......... | 375/240.12 |
| 2006/0176961 A1 | 8/2006 | Huo et al. | |
| 2009/0087111 A1* | 4/2009 | Noda et al. .................... | 382/238 |
| 2010/0098156 A1* | 4/2010 | Karczewicz et al. .... | 375/240.12 |
| 2011/0188576 A1 | 8/2011 | Clerckx et al. | |
| 2011/0216834 A1 | 9/2011 | Zhou | |
| 2014/0198842 A1* | 7/2014 | He et al. ................... | 375/240.03 |
| 2014/0269912 A1* | 9/2014 | Sullivan .................. | 375/240.12 |

OTHER PUBLICATIONS

International Search Report and Written opinion for PCT Patent Application No. PCT/US2011/062778, mailed on Aug. 22, 2012, 9 Pages.

Official Letter and Search Report for Taiwan (R.O.C.) Patent Application No. 101144707, mailed Nov. 12, 2015, 3 pages.

* cited by examiner

MOTION ESTIMATION METHODS FOR RESIDUAL PREDICTION

BACKGROUND

Scalable Video Coding (SVC) is an extension of the H.264/AVC video coding standard. SVC allows multi-layered video streams to be encoded in a single bit stream composed of a base layer and optional additional enhancement layers that can improve resolution, frame rate, and quality. Inter-layer residual prediction is a key compression technique in SVC. As the motion vectors in the base layer and an enhancement layer tend to be similar, an up-sampled residual block from the base layer also tends to have similar residuals to the corresponding macroblock (MB) in the enhancement layer. Thus, base layer residuals may be used as predictors for enhancement layer residuals. An encoder may decide whether to use residual prediction or not by comparing the energy of the residuals with and without inter-layer prediction.

In regular motion estimation, an encoder seeks a motion vector that minimizes the distortion between the current MB and a given reference MB. When using Sum of Absolute Differences (SAD) as the distortion measurement, the differences between the current pixel c and each reference pixel p is give by $|c-p|$. This difference is summed over a given block size to obtain the block distortion. Assuming that pixel depth is 8-bit, both c and p are 8-bit values.

For residual prediction, the encoder seeks a motion vector that minimizes $|c-p-r|$ over the search range, where r is the residual value from base layer. This expression may be rewritten as $|(c-r)-p|$ because c and r are predetermined values for a given MB and only p varies over the search range. Typically, c and p have 8-bit values and r has a 9-bit value within the range of −255 to 255, and thus, (c−r) will be a 10-bit value within the range of −255 to 510.

The challenge for residual prediction is that typical motion estimation engines cannot be directly used because of the increased bit depth associated with (c−r). Using 10-bit instead of 8-bit values may incur significant cost due to increased datapath width and increased accuracy in arithmetic operations. One way to convert (c−r) to 8 bit values is clipping. However, clipping errors may impact motion estimation quality especially when c is very bright (close to 255) or very dark (close to 0) and/or when the magnitude of r is large.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Figure 1:
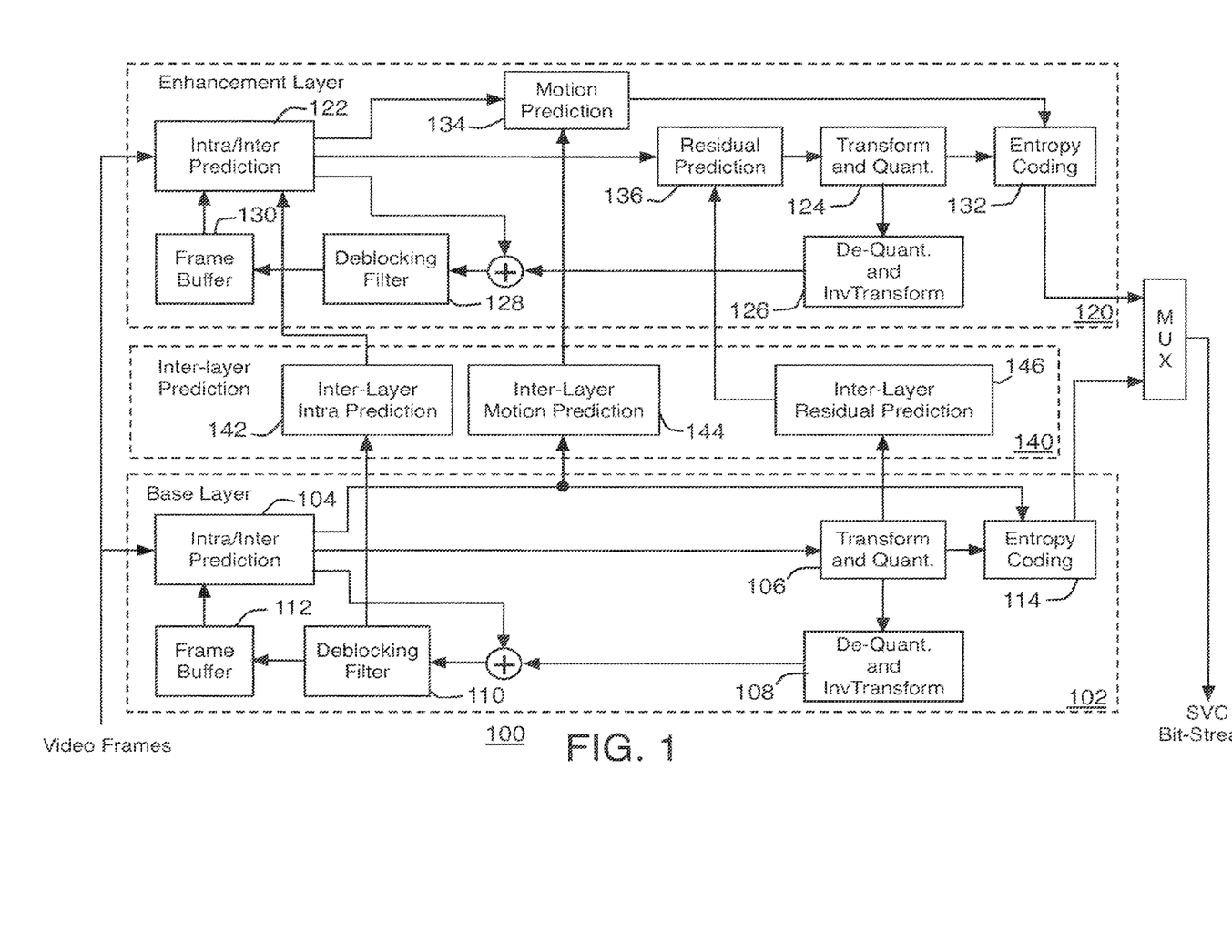
FIG. 1 is an illustrative diagram of an example video encoder system.

FIG. 1 illustrates an example video encoder system 100 in accordance with the present disclosure. In various implementations, video encoder system 100 may be configured to undertake video compression and/or implement video codecs according to one or more advanced video codec standards, such as, for example, the H.264 standard (see ISO/IEC JTC1 and ITU-T, H.264/AVC—Advanced video coding for generic audiovisual services," ITU-T Rec, H.264 and ISO/IEC 14496-10 (MPEG-4 part 10), version 3, 2005) and extensions thereof including the Scalable Video Coding (SVC) extension (see Joint Draft ITU-T Rec. H.264 and ISO/IEC 14496-10/ Amd.3 Scalable video coding, Jul. 5, 2007) (hereinafter the "SVC standard"). Although system 100 and/or other systems, schemes or processes may be described herein in the context of the SVC standard for the purposes of illustration and explanation, the present disclosure is not limited to any particular video encoding standard or specification.

In various embodiments, video encoder system 100 may implement at least two distinct encoding layers including a lower spatial resolution base layer 102 and at least one higher spatial resolution enhancement layer 120. For example, image frames in base layer 102 may have a resolution of 352×288 pixels (CIF resolution) while enhancement layer 120 may have a resolution 760×480 pixels (SD resolution) and so forth. Further, in various implementations the different layers may have different frames rates. For example, base layer 102 may have a frame rate of fifteen (15) frames-per-second (fps) while enhancement layer 120 may have a frame rate of thirty (30) fps and so forth. While FIG. 1, illustrates two layers, base layer 102 and enhancement layer 120, those of skill in the art may recognize that encoder systems configured to undertake scalable video encoding, such as system 100, may include multiple enhancement layers. For example, system 100 may include one or more additional enhancement layers (not shown), and the techniques and/or schemes described herein may also apply to such additional enhancement layers, the present disclosure not being limited to any particular scalable video schemes or formats. Base layer 102 may include various modules such as an intra/inter prediction module 104, a transform and quantization module 106, a de-quantization and inverse transform module 108, a de-blocking filter module 110, a frame buffer module 112, and an entropy coding module 114. The functionality of modules 104-114 is well known (see, e.g., the SVC standard) and will not be described in greater detail herein. Enhancement layer 120 may include various modules such as an intra/inter prediction module 122, a transform and quantization module 124, a de-quantization and inverse transform module 126, a de-blocking filter module 128, a frame buffer module 130, and an entropy coding module 132. The functionality of modules 122-132 of enhancement layer 120 is similar to correspondingly labeled modules 104-114 of base layer 102 and will not be described in greater detail herein. Enhancement layer 120 may further include a motion prediction module 134 and a residual prediction module 136 as will be described in greater detail below.

In various implementations, video encoder system 100 may also include various inter-layer prediction modules 140 including an inter-layer intra prediction module 142, an inter-layer motion prediction module 144, and an inter-layer residual prediction module 146. Inter-layer intra prediction module 142 may undertake texture prediction for internal blocks of base layer 102 such that an intra block predicted in base layer 102 may be used as a predictor for one or more blocks in enhancement layer 120. Inter-layer motion prediction module 144 may operate to identify motion vectors generated in base layer 102 that may be used by motion prediction module 134 to undertake motion prediction for blocks in enhancement layer 120.

In various implementations, inter-layer residual prediction module 146 may be employed to identify residual values of base layer 102 that may be used by residual prediction module 136 to undertake residual prediction in enhancement layer 120. In various implementations, inter-layer residual prediction may be undertaken in system 100 for some or all inter-coded macroblocks (MBs). For example, a flag may be added to the MB syntax for enhancement layer 120 to indicate the usage of inter-layer residual prediction for a given MB. For instance, when this residual prediction flag has a value of one, the residual signal of a corresponding sub-MB of base layer 102 may be upsampled into enhancement layer 120 via inter-layer residual prediction module 146 (e.g., by using a bilinear filter) and may be used as a predictor by residual prediction module 136 to aid in the generation of the residual signal of enhancement layer 120 MB. In various implementations, inter-layer residual prediction module 146 may provide predictors to residual prediction module 136 in the form of residual pixel values (r). For 8-bit image depth, a residual pixel value (r) may be a 9-bit integer value.

Figure 2:
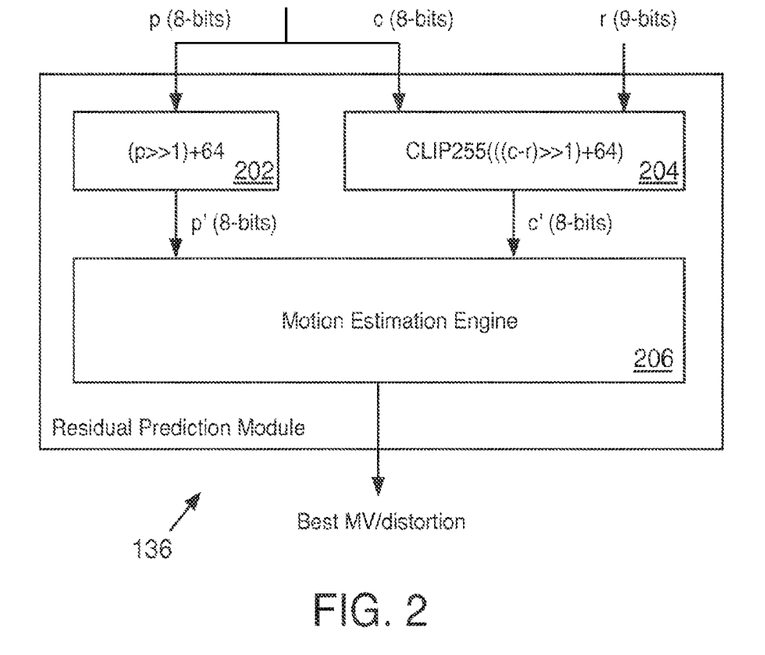
FIG. 2 illustrates a portion of the system of FIG. 1 in greater detail.

FIG. 2 illustrates residual prediction module 136 of system 100 in greater detail in accordance with the present disclosure. In various implementations, residual prediction module 136 may include a first preprocessing module 202, a second preprocessing module 204, and a motion estimation module 206. In various embodiments, the first preprocessing module 202 may be implemented in hardware, and the second preprocessing module 204 may be implemented in software. However, the present disclosure is not limited in this regard and module 202 and/or module 204 may be implemented in hardware, software or firmware or any combination thereof.

In accordance with the present disclosure, residual prediction module 136 may use first preprocessing module 202 to perform various operations on a reference pixel value (p) to generate a modified reference pixel value (p'), and use second preprocessing module 204 to perform various operations on a current pixel value (c) in combination with a residual pixel value (r) to generate a modified current pixel value (c'). Motion estimation module 206 may then undertake known motion estimation techniques, for example by determining a Sum of Absolute Differences (SAD) using, at least in part, the p' and c' values, to obtain a best motion vector (MV) and associated residual signal (distortion) for a given enhancement layer MB.

In accordance with the present disclosure, the first preprocessing module 202 may receive a reference pixel value (p) as input and may first reduce the bit-length of the reference pixel value by one and then add a predetermined value to the resulting reduced bit-length value. In various implementations, right shifting the reference pixel value may be used to reduce the bit-length of the reference pixel value. For example, for 8-bit image depths, where the reference pixel value (p) is an 8-bit value, the value sixty-four (64) may be added to the result of right shifting p by one to generate a modified reference pixel value p' having 8-bits and ranging in value from sixty-four (64) to one hundred ninety-one (191).

The result of the operations undertaken by first preprocessing module 202 for 8-bit input values may be represented by the following expression:

$$p'=(p>>1)+64 \qquad (1)$$

In accordance with the present disclosure, the second preprocessing module 204 may receive a current pixel value (c) and a residual pixel value (r) as input, may determine a difference value (c−r), may reduce the bit-length of the difference value by right shifting it by one, add a predetermined value to the right-shifted difference value, and then restrict or clip the result to a particular range of values. For example, for 8-bit image depths, where the current pixel value (c) is an 8-bit value, the residual pixel value (r) is a 9-bit value, and the difference value (c−r) is a 10-bit value, the value sixty-four (64) may be added to the right-shifted difference value to generate an intermediate result having values ranging between minus sixty-four (64) and three hundred nineteen (319). The intermediate result values may then be clipped so that original difference values ranging between minus two hundred fifty-five (−255) and minus one hundred twenty-eight (−128) are set to a clipped value of zero, and so that original difference values ranging from three hundred eighty-three (383) to five hundred twelve (512) are set to a clipped value of two hundred fifty-five (255). The result of the operations undertaken by second preprocessing module 204 for 8-bit input current pixel values and 9-bit input residual pixel values may be represented by the following expression:

$$c'=CLIP255(((c-r)>>1)+64) \quad (2)$$

Table 1, summarizes various values associated with equations (1) and (2) for 8-bit image depths:

TABLE 1

| Variable | Type | Integer range |
|---|---|---|
| Current pixel value (c) | 8-bit binary | 0-255 |
| Reference pixel value (p) | 8-bit binary | 0-255 |
| Residual pixel value (r) | 9-bit binary | −255-255 |
| Difference value = (c − r) | 10-bit binary | −255-510 |
| ((c − r) >> 1) + 64 | 9-bit binary | −64-319 |
| c' = CLIP255(((c − r) >> 1) + 64) | 8-bit binary | 0-255 |
| p' = (p >> 1) + 64 | 8-bit binary | 64-191 |

Figure 3:
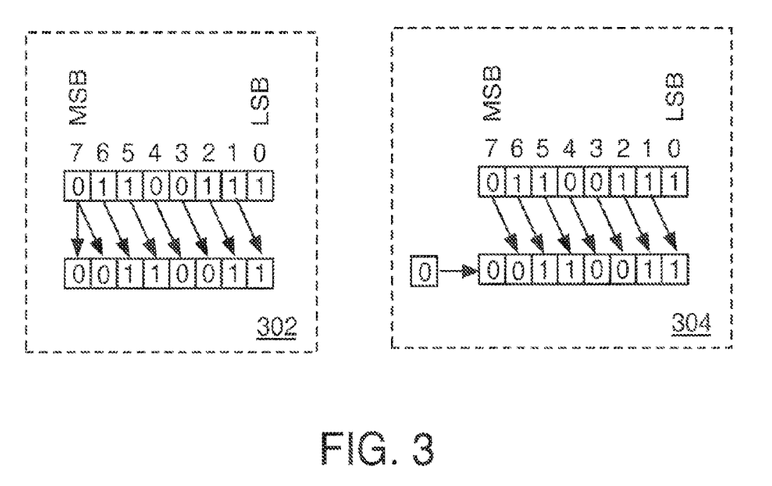
FIG. 3 illustrates example bitwise operations.

In various implementations, the term "right shift" as used herein may correspond to a bitwise operation that moves the bits of the data word representing a value (such as p or (c−r)) one or more bit positions to the right within a register. In various implementations, performing a right shift may include performing an arithmetic shift or a logical shift. For example, FIG. 3 illustrates a right shift by one in the form of an arithmetic right shift operation 302 and a logical right shift operation 304 performed on an example binary value having a bit-length of eight (i.e., an 8-bit value). For example, as those of skill in the art may recognize, in various software languages (e.g., C, C++, etc.) a right shift operator may be represented by the symbol ">>" (as used herein, for example, in equations (1) and (2)) and the corresponding operation may be an arithmetic right shift when the operand is a signed integer. In such notation, the number of places to shift may be provided as the second argument.

Figure 4:
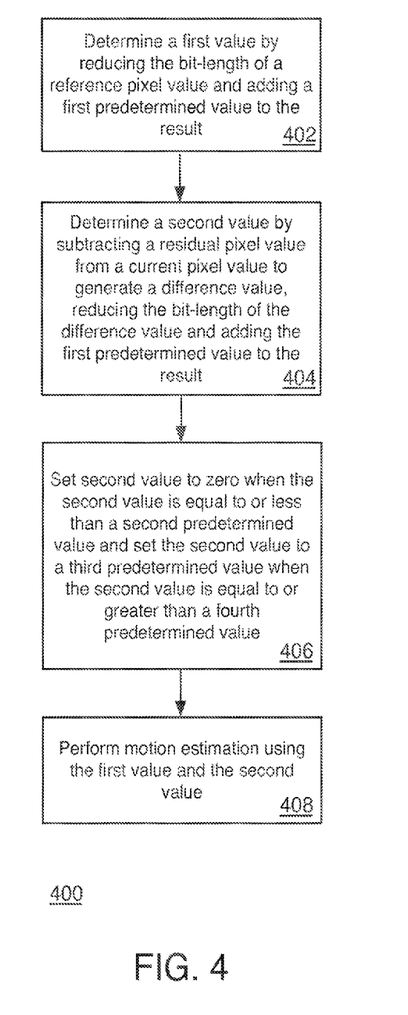
FIG. 4 is a flow chart of an example residual prediction process.

FIG. 4 illustrates a flow diagram of an example process 400 for residual prediction according to various implementations of the present disclosure. Process 400 may include one or more operations, functions or actions as illustrated by one or more of blocks 402, 404, 406 and 408 of FIG. 4. By way of non-limiting example, process 400 will be described herein with reference to example system 100 of FIGS. 1 and 2. In various implementations, encoder (e.g., system 100) may undertake process 400 when performing motion estimation in enhancement layer 120. Process 400 may begin at block 402 with the determination of a first value by reducing the bit-length of a reference pixel value and adding a first predetermined value to the result. In various implementations, block 402 may involve video encoder system 100 using preprocessing module 202 of residual prediction module 136 to right shift an input reference pixel value (p) and add a predetermined constant value to the result as described above. For example, for an 8-bit reference pixel value, preprocessing module 202 may implement the operational equivalent of equation (1) by right shifting the reference pixel value by one and adding sixty-four to the result.

At block 404, a second value may be determined by subtracting a residual pixel value from a current pixel value to generate a difference value, reducing the bit-length of the difference value and then adding the first predetermined value to the result. In various implementations, block 404 may involve video encoder system 100 using preprocessing module 204 of residual prediction module 136 to subtract a residual pixel value (r) from a current pixel value (c) to generate a difference value (c−r), right shift the difference value, and then add the first predetermined value to the right-shifted result. For example, for an 8-bit current pixel value and a 9-bit residual pixel value, the difference value (c−r) is a 10-bit value, and block 404 may involve right shifting the difference value by one and adding sixty-four to the result.

At block 406, the second value may be set to zero when the second value is equal to or less than a second predetermined value, and may be set to a third predetermined value when the second value is equal to or greater than a fourth predetermined value. In various implementations, block 406 may involve video encoder system 100 using preprocessing module 204 of residual prediction module 136 to clip or restrict the result of block 404 to a particular range of values. For example, for 8-bit image depths, the result of block 404 may have integer values ranging between minus two hundred fifty-five and five hundred twelve. Block 406 may then involve clipping the output of block 404 so that values ranging between minus two hundred fifty-five and minus one hundred twenty-eight (second predetermined value) are set to a value of zero, and so that values ranging from three hundred eighty-three (fourth predetermined value) to five hundred twelve are set to a value of two hundred fifty-five (third predetermined value).

In undertaking blocks 404 and 406, preprocessing module 204 may implement the operational equivalent of equation (2) as set forth above. Thus, for 8-bit image depths, the implementation of equation (2) may truncate modified current pixel values (c') ranging in value from minus two hundred fifty-five to minus one hundred twenty-eight to a value of zero, and modified current pixel values (c') ranging in value from three hundred eighty-three to five hundred twelve to a value of two hundred fifty-five. For modified current pixel values (c') ranging in value from minus one hundred twenty-eight to three hundred eighty-three, implementation of equation (2) may only result in the loss of a Least Significant Bit (ISB) from odd values within that range.

At block 408 the first value resulting from block 402 and the second value resulting from block 406 may be used to perform motion estimation for the purposes of inter-layer residual prediction. Thus, in various implementations, the modified reference pixel value (p') resulting from block 402 and the modified current pixel value (c') resulting from block 406 may then be used by motion estimation engine 206 to perform motion estimation at block 408. For example, to do so, motion estimation engine 206 may employ known block matching algorithms using p' and c'' based on various distortion measurements or evaluation metrics such as Sum of Absolute Differences (SAD), Mean Squared Error (MSE), Mean Absolute Difference (MAD), Sum of Squared Errors (SSE), Sum of Absolute Transformed Differences (SATD), and the like.

In various implementations, when performing motion estimation for residual prediction at block 408, motion estimation engine 206 may determine a motion vector that minimizes the distortion between a current MB and a given reference MB. For example, when using SAD as the distortion measurement for residual prediction in accordance with the present disclosure, motion estimation engine 206 may determine a motion vector that minimizes over a search range. Further, by employing modified reference pixel (p') and modified current pixel (c') values generated in accordance with the present disclosure, a video encoder system may avoid significant clipping errors. In addition, an encoder may decide whether to undertake residual prediction using process 400 by comparing the energy of the residuals with and without inter-layer prediction.

While implementation of example process 400, as illustrated in FIG. 4, may include the undertaking of all blocks shown in the order illustrated, the present disclosure is not limited in this regard and, in various examples, implementation of process 400 may include the undertaking only a subset of the blocks shown and/or in a different order than illustrated.

In addition, any one or more of the blocks of FIG. 4 may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIG. 4 in response to instructions conveyed to the processor by a computer readable medium.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 5:
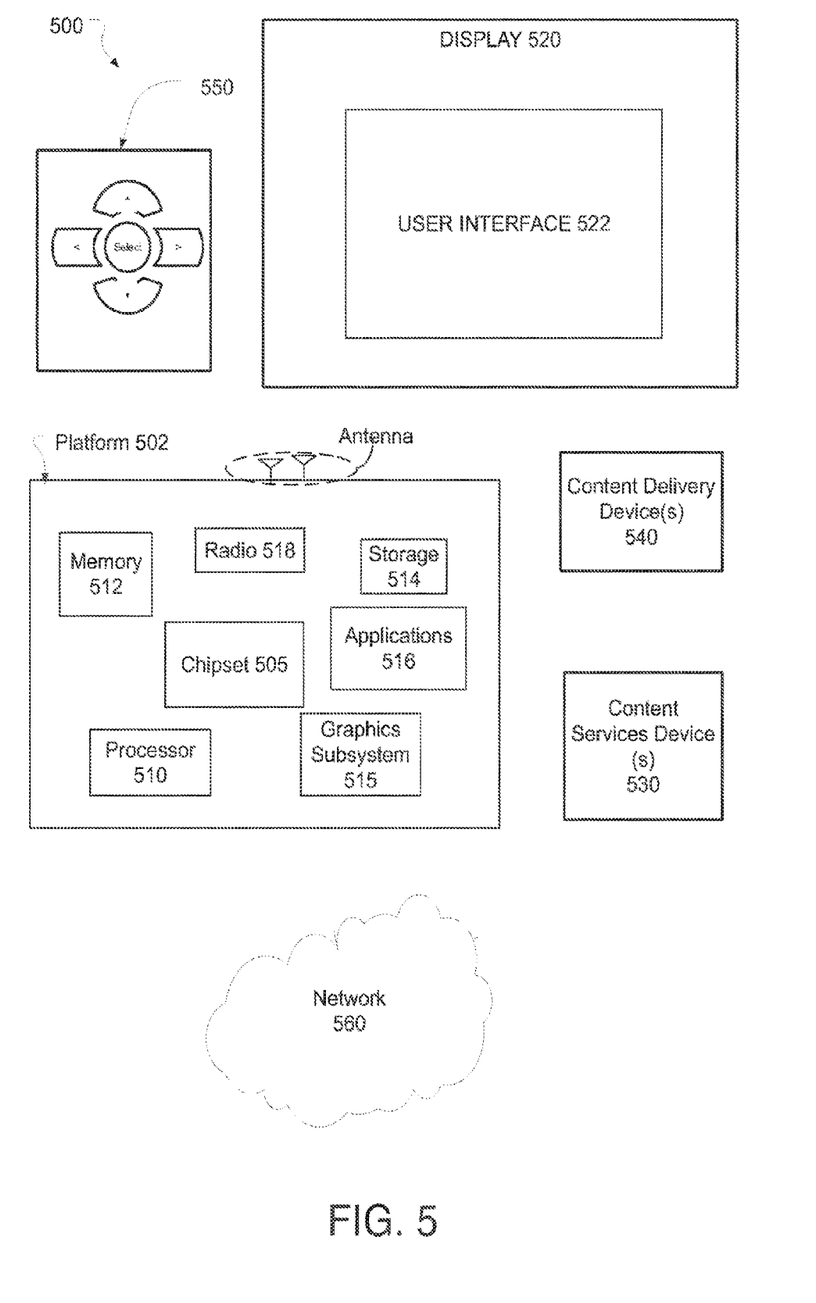
FIG. 5 is an illustrative diagram of an example system.

FIG. 5 illustrates an example system 500 in accordance with the present disclosure. In various implementations, system 500 may be a media system although system 500 is not limited to this context. For example, system 500 may be incorporated into a personal computer (PC), laptop computer, ultra-laptop computer, tablet, touch pad, portable computer, handheld computer, palmtop computer, personal digital assistant (PDA), cellular telephone, combination cellular telephone/FDA, television, smart device (e.g., smart phone, smart tablet or smart television), mobile internet device (MID), messaging device, data communication device, and so forth.

In various implementations, system 500 includes a platform 502 coupled to a display 520. Platform 502 may receive content from a content device such as content services device(s) 530 or content delivery device(s) 540 or other similar content sources. A navigation controller 550 including one or more navigation features may be used to interact with, for example, platform 502 and/or display 520. Each of these components is described in greater detail below.

In various implementations, platform 502 may include any combination of a chipset 505, processor 510, memory 512, storage 514, graphics subsystem 515, applications 516 and/or radio 518. Chipset 505 may provide intercommunication among processor 510, memory 512, storage 514, graphics subsystem 515, applications 516 and/or radio 518. For example, chipset 505 may include a storage adapter (not depicted) capable of providing intercommunication with storage 514.

Processor 510 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 510 may be dual-core processor(s), dual-core mobile processor(s), and so forth. Memory 512 may be implemented as a volatile memory device such as, but not limited to, a Random Access Memory (RAM), Dynamic Random Access Memory (DRAM), or Static RAM (SRAM).

Storage 514 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 514 may include technology to increase the storage performance enhanced protection for valuable digital media when multiple hard drives are included, for example.

Graphics subsystem 515 may perform processing of images such as still or video for display. Graphics subsystem 515 may be a graphics processing unit (GPU) or a visual processing unit (WU), for example. An analog or digital interface may be used to communicatively couple graphics subsystem 515 and display 520. For example, the interface may be any of a High—Definition Multimedia Interface, DisplayPort, wireless HDMI, and/or wireless HD compliant techniques. Graphics subsystem 515 may be integrated into processor 510 or chipset 505. In some implementations, graphics subsystem 515 may be a stand-alone card communicatively coupled to chipset 505.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In a further embodiments, the functions may be implemented in a consumer electronics device.

Radio 518 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 518 may operate in accordance with one or more applicable standards in any version.

In various implementations, display 520 may include any television type monitor or display. Display 520 may include, for example, a computer display screen, touch screen display, video monitor, television-like device, and/or a television. Display 520 may be digital and/or analog. In various implementations, display 520 may be a holographic display. Also, display 520 may be a transparent surface that may receive a visual projection. Such projections may convey various forms of information, images, and/or objects. For example, such projections may be a visual overlay for a mobile augmented reality (MAR) application. Under the control of one or more software applications 516, platform 502 may display user interface 522 on display 520. In various implementations, content services device(s) 530 may be hosted by any national, international and/or independent service and thus accessible to platform 502 via the Internet, for example. Content services device(s) 530 may be coupled to platform 502 and/or to display 520. Platform 502 and/or content services device(s) 530 may be coupled to a network 560 to communicate (e.g., send and/or receive) media information to and from network 560. Content delivery device(s) 540 also may be coupled to platform 502 and/or to display 520. In various implementations, content services device(s) 530 may include a cable television box, personal computer, network, telephone, Internet enabled devices or appliance capable of delivering digital information and/or content, and any other similar device capable of unidirectionally or bidirectionally communicating content between content providers and platform 502 and/or display 520, via network 560 or directly. It will be appreciated that the content may be communicated unidirectionally and/or bidirectionally to and from any one of the components in system 500 and a content provider via network 560. Examples of content may include any media information including, for example, video, music, medical and gaming information, and so forth.

Content services device(s) 530 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 502 may receive control signals from navigation controller 550 having one or more navigation features. The navigation features of controller 550 may be used to interact with user interface 522, for example. In embodiments, navigation controller 550 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 550 may be replicated on a display (e.g., display 520) by movements of a pointer, cursor, focus ring, or other visual indicators displayed on the display. For example, under the control of software applications 516, the navigation features located on navigation controller 550 may be mapped to virtual navigation features displayed on user interface 522, for example. In embodiments, controller 550 may not be a separate component but may be integrated into platform 502 and/or display 520. The present disclosure, however, is not limited to the elements or in the context shown or described herein. In various implementations, drivers (not shown) may include technology to enable users to instantly turn on and off platform 502 like a television with the touch of a button after initial boot-up, when enabled, for example. Program logic may allow platform 502 to stream content to media adaptors or other content services device(s) 530 or content delivery device(s) 540 even when the platform is turned "off." In addition, chipset 505 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 500 may be integrated. For example, platform 502 and content services device(s) 530 may be integrated, or platform 502 and content delivery device(s) 540 may be integrated, or platform 502, content services device(s) 530, and content delivery device(s) 540 may be integrated, for example. In various embodiments, platform 502 and display 520 may be an integrated unit. Display 520 and content service device(s) 530 may be integrated, or display 520 and content delivery device(s) 540 may be integrated, for example. These examples are not meant to limit the present disclosure.

In various embodiments, system 500 may be implemented as a wireless system, a wired system, or a combination of both. When implemented as a wireless system, system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RE spectrum and so forth. When implemented as a wired system, system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth. Platform 502 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

Figure 6:
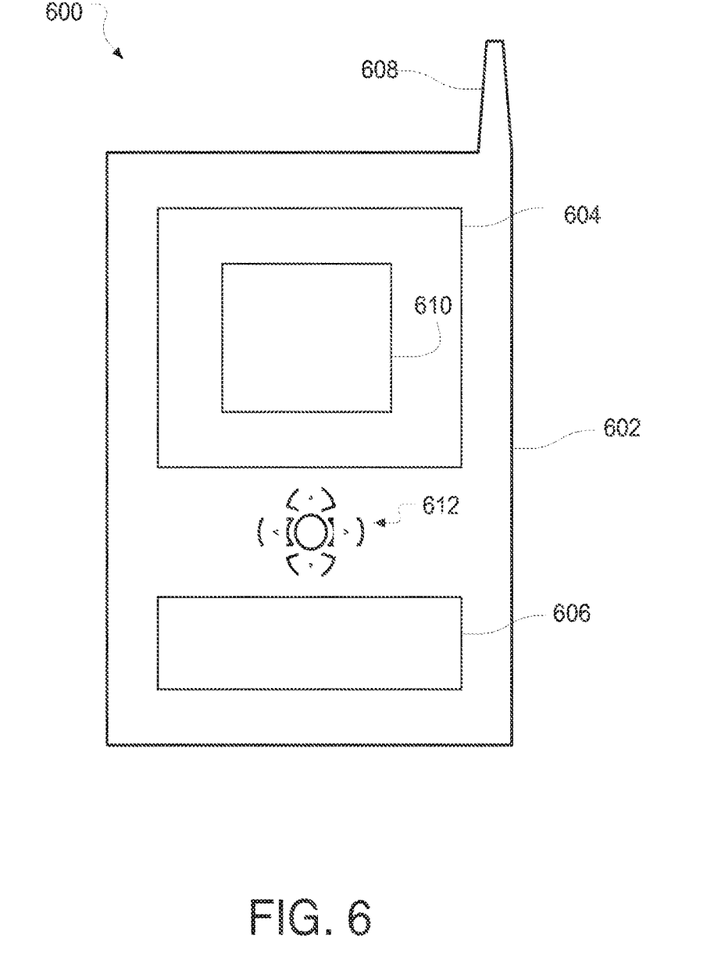
FIG. 6 is an illustrative diagram of an example device, all arranged in accordance with at least some implementations of the present disclosure.

As described above, system 500 may be embodied in varying physical styles or form factors. FIG. 6 illustrates implementations of a small form factor device 600 in which system 500 may be embodied. In embodiments, for example, device 600 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 6, device 600 may include a housing 602, a display 604, an input/output (I/O) device 606, and an antenna 608. Device 600 also may include navigation features 612. Display 604 may include any suitable display unit for displaying information appropriate for a mobile computing device. I/O device 606 may include any suitable I/O device for entering information into a mobile computing device. Examples for I/O device 606 may include an alphanumeric keyboard, a numeric keypad, a touch pad, input keys, buttons, switches, rocker switches, microphones, speakers, voice recognition device and software, and so forth. Information also may be entered into device 600 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A computer-implemented method, comprising:
at a video encoder:
receiving a reference pixel value;
receiving a current pixel value and a residual pixel value;
determining, via a first preprocessing hardware module, a first value by reducing a bit-length of the reference pixel value and adding a first predetermined value to the result;
determining, via a second preprocessing module, a second value by subtracting the residual pixel value from the current pixel value to generate a difference value, reducing a bit-length of the difference value and adding the first predetermined value to the result;
setting the second value to zero when the second value is equal to or less than a second predetermined value and setting the second value to a third predetermined value when the second value is equal to or greater than a fourth predetermined value; and
wherein the first value and the second value are used to perform motion estimation for inter-layer residual prediction.

2. The method of claim 1, wherein the video encoder comprises a Scalable Video Coding (SVC) encoder, and wherein the SVC encoder is configured to perform inter-layer residual prediction.

3. The method of claim 2, wherein the residual pixel value comprises a residual pixel value of a base layer, and wherein the reference pixel value and the current pixel value comprise pixel values of an enhancement layer.

4. The method of claim 1, wherein reducing the bit-length of the reference pixel value comprises right shifting the reference pixel value, and wherein reducing the bit-length of the difference value comprises right shifting the difference value.

5. The method of claim 4, wherein right shifting the reference pixel value comprises right shifting the reference pixel value by one, and wherein right shifting the difference value comprises right shifting the difference value by one.

6. The method of claim 1, wherein the reference pixel value and the current pixel value comprise eight-bit values, and wherein the residual pixel value comprises a nine-bit value.

7. The method of claim 6, wherein the first predetermined value comprises sixty-four, wherein the second predetermined value comprises minus one hundred twenty-eight, wherein the third predetermined value comprises two hundred fifty-five, and wherein the fourth predetermined value comprises three hundred eighty-three.

8. An article comprising a non-transitory computer program product having stored therein instructions that, if executed, result in:
at an video encoder:
receiving a reference pixel value;
receiving a current pixel value and a residual pixel value;
determining, via a first preprocessing hardware module, a first value by reducing a bit-length of the reference pixel value and adding a first predetermined value to the result;
determining, via a second preprocessing module, a second value by subtracting the residual pixel value from the current pixel value to generate a difference value, reducing a bit-length of the difference value and adding the first predetermined value to the result;

setting the second value to zero when the second value is equal to or less than a second predetermined value and setting the second value to a third predetermined value when the second value is equal to or greater than a fourth predetermined value; and wherein the first value and the second value are used to perform motion estimation for inter-layer residual prediction.

9. The article of claim 8, wherein the video encoder comprises a Scalable Video Coding (SVC) encoder, and wherein the SVC encoder if configured to perform inter-layer residual prediction.

10. The article of claim 9, wherein the residual pixel value comprises a residual pixel value of a base layer, and wherein the reference pixel value and the current pixel value comprise pixel values of an enhancement layer.

11. The article of claim 8, wherein reducing the bit-length of the reference pixel value comprises right shifting the reference pixel value, and wherein reducing the bit-length of the difference value comprises right shifting the difference value.

12. The article of claim 8, wherein the reference pixel value and the current pixel value comprise eight-bit values, and wherein the residual pixel value comprises a nine-bit value.

13. An apparatus, comprising:
a processor configured to:
receive a reference pixel value;
receive a current pixel value and a residual pixel value;
determine, via a first preprocessing hardware module, a first value by reducing bit-length of the reference pixel value and adding a first predetermined value to the result;
determine, via a second preprocessing hardware module, a second value by subtracting the residual pixel value from the current pixel value to generate a difference value, reducing a bit-length of the difference value and adding the first predetermined value to the result;
set the second value to zero when the second value is equal to or less than a second predetermined value and set the second value to a third predetermined value when the second value is equal to or greater than a fourth predetermined value; and
wherein the first value and the second value are used to perform motion estimation for inter-layer residual prediction.

14. The apparatus of claim 13, wherein the processor is configured to implement a Scalable Video Coding (SVC) encoder and to perform inter-layer residual prediction.

15. The apparatus of claim 14, wherein the residual pixel value comprises a residual pixel value of a base layer, and wherein the reference pixel value and the current pixel value comprise pixel values of an enhancement layer.

16. The apparatus of claim 13, wherein the processor is configured to reduce the bit-length of the reference pixel value by right shifting the reference pixel value, and wherein the processor is configured to reduce the bit-length of the difference value by right shifting the difference value.

17. The apparatus of claim 13, wherein the reference pixel value and the current pixel value comprise eight-bit values, and wherein the residual pixel value comprises a nine-bit value.

18. A system comprising:
a antenna to transmit encoded video data; and
a video encoder, wherein the video encoder is communicatively coupled to the antenna and wherein the video encoder is to generate the encoded video data by, at least in part:
receiving a reference pixel value;
receiving a current pixel value and a residual pixel value;
determining, via a first preprocessing hardware module, a first value by reducing a bit-length of the reference pixel value and adding a first predetermined value to the result;
determining, via a second preprocessing module, a second value by subtracting the residual pixel value from the current pixel value to generate a difference value, reducing a bit-length of the difference value and adding the first predetermined value to the result;
setting the second value to zero when the second value is equal to or less than a second predetermined value and setting the second value to a third predetermined value when the second value is equal to or greater than a fourth predetermined value; and
wherein the first value and the second value are used to perform motion estimation for inter-layer residual prediction.

19. The system of claim 18, wherein the video encoder comprises a Scalable Video Coding (SVC) encoder, and wherein the SVC encoder is to perform inter-layer residual prediction.

20. The system of claim 19, wherein the residual pixel value comprises a residual pixel value of a base layer, and wherein the reference pixel value and the current pixel value comprise pixel values of an enhancement layer.

21. The system of claim 18, wherein reducing the bit-length of the reference pixel value comprises right shifting the reference pixel value, and wherein reducing the bit-length of the difference value comprises right shifting the difference value.

22. The system of claim 18, wherein the reference pixel value and the current pixel value comprise eight-bit values, and wherein the residual pixel value comprises a nine-bit value.

* * * * *